May 13, 1941. G. C. NOROS 2,241,713
MOVABLE TRUCK JACK
Filed Oct. 13, 1939 2 Sheets-Sheet 1

INVENTOR
George C. Noros.

WITNESS
F. J. Hartman.

ATTORNEY

May 13, 1941.   G. C. NOROS   2,241,713
MOVABLE TRUCK JACK
Filed Oct. 13, 1939   2 Sheets-Sheet 2

INVENTOR
George C. Noros.

WITNESS

ATTORNEY

Patented May 13, 1941

2,241,713

UNITED STATES PATENT OFFICE 2,241,713

MOVABLE TRUCK JACK

George C. Noros, Manheim, Pa., assignor to Bond Foundry & Machine Company, Manheim, Pa., a corporation of Pennsylvania Application October 13, 1939, Serial No. 299,258

11 Claims. (Cl. 280—46)

This invention relates to jacks of the type intended for temporary attachment to a truck or the like having casters at one end and fixed supporting means at the other for the purpose of raising the latter from the floor to enable the truck to be moved about on its wheels and the wheels forming component elements of the jack.

Jacks and other devices designed for a similar purpose are now in more or less in general use but those with which I am familiar are of intricate and complicated construction, difficult to operate and/or for other reasons unsuited to most satisfactory and convenient use in shops, mills and the like which trucks of the character of those to which I have referred are most commonly employed.

It will be understood that such trucks, irrespective of their particular body construction, essentially comprise a pair of wheels adjacent one end, hereinafter termed the rear end, and some form of fixed supporting means or feet adjacent the opposite or front end so that when these feet are resting on the floor the truck is supported by them and by the wheels in, ordinarily, a substantially horizontal position. The jack of my invention is adapted for association with a truck of this general class and comprises a pair of cooperative elements one of which is permanently fixed to the truck and which for convenience I call the coupling and the other, comprising inter alia a wheeled body, is adapted for removable connection therewith to raise or lower the adjacent end of the truck so the latter can be moved about on its own wheels supplemented by those of the jack itself.

It is therefore an object of the invention to provide a truck jack of the general character aforesaid by means of which the raising and lowering of the truck end to clear the fixed supporting means from the floor or return them thereto may be easily and accurately effected; which assures full control of the movements of the truck by the operator at all times and which is so designed that accidental or inadvertent release of the truck from raised position is substantially prevented.

A further object of the invention is to provide such a truck jack which is of novel construction, affords a good leverage to the operator when raising and lowering the truck, is extremely durable and capable of withstanding the severe duty to which a mechanism of this character is ordinarily subjected, and which comprises but few parts of simple and rugged construction and is therefore not likely to get out of order or become inoperative under normal conditions of use.

Another object is to provide in a truck jack of this character a movable handle for controlling the jack when elevating or lowering the truck end to clear the fixed supporting means from the floor or return them thereto and also for guiding and controlling the truck while it is being moved about, the handle being mounted relatively to the jack body in such manner as to be readily adjusted to the height above the floor best suited to the convenience of the operator without sacrifice of its ability to afford at all times adequate control of the jack, and hence of the truck.

Other objects, purposes and advantages of the invention will hereafter more fully appear or will be understood from the following description of a preferred embodiment of it during which reference will be had to the accompanying drawings, in which Fig. 1 is a fragmentary side elevation of a typical truck with the jack in operative relation thereto;

The same characters of reference are used to designate the several parts in each figure, and for the sake of clearness of illustration representation of the truck has been omitted from Figs. 2–5 inclusive.

Figure 1:
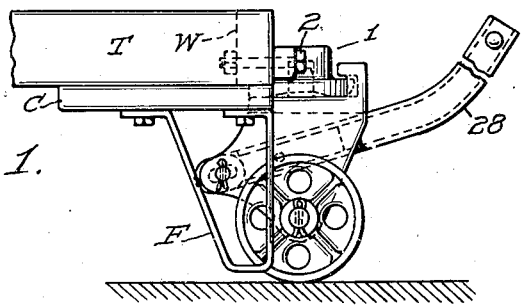

Referring now more particularly to the drawings, the truck T of course may be of substantially any specific character and is provided with a pair of wheels at one end (not shown) and at the other, or front end, shown in Fig. 1, with fixed supporting means such as feet F preferably disposed adjacent the truck corners and secured to a transverse cleat C on its under side so that when resting on the floor the feet support the adjacent end of the truck at substantially the same height above the floor as the rear wheels support the opposite end therefrom. As trucks of this general design are in common use no further description of the one fragmentarily shown in Fig. 1 is required.

Figure 2:
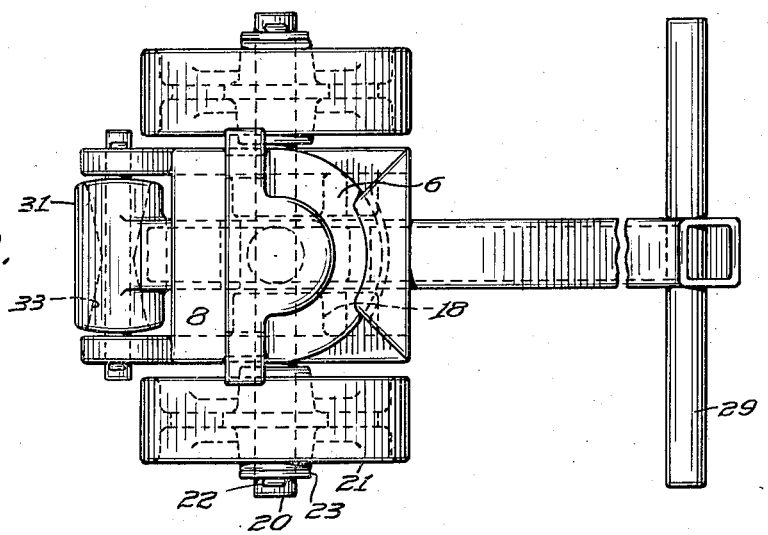
Fig. 2 is a fragmentary top plan view of the jack on an enlarged scale in the position shown in Fig. 1 but removed from the truck.
Figure 3:
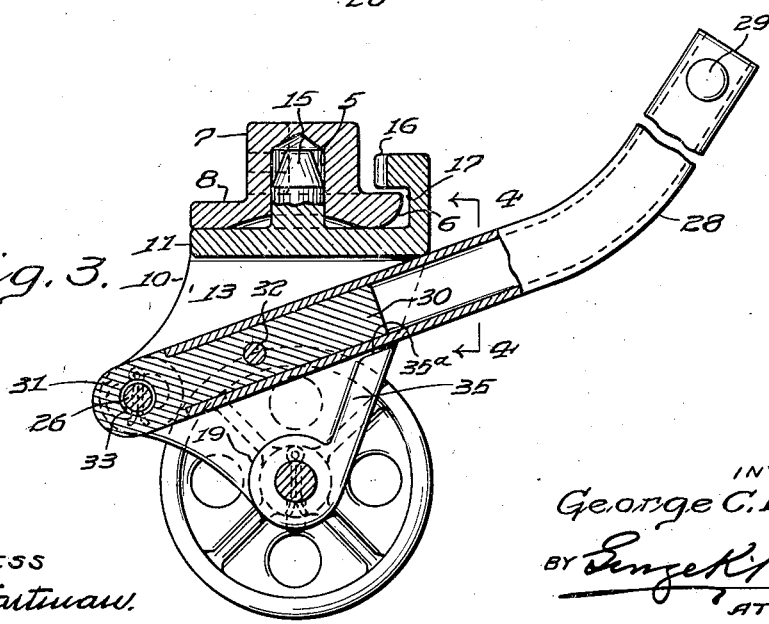
Fig. 3 is a fragmentary side elevation thereof largely broken away into central vertical section.
Figure 4:
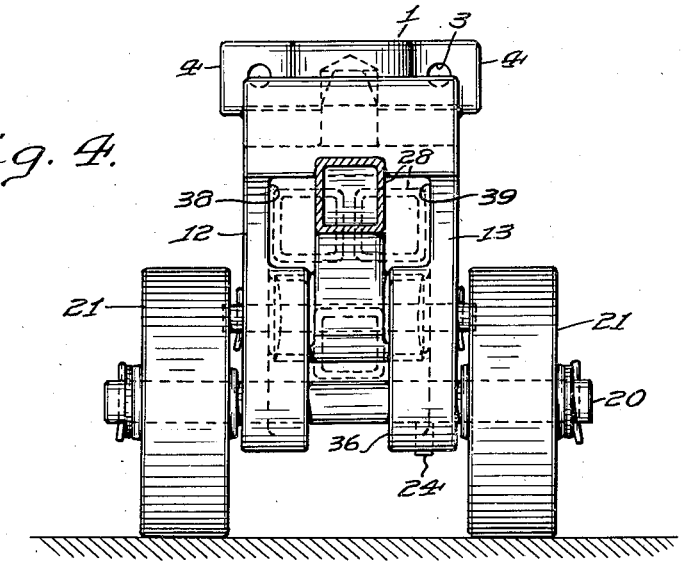
Fig. 4 is a section on the line 4—4 in Fig. 3 with certain positions of the guiding tongue indicated in broken lines.
Figure 5:
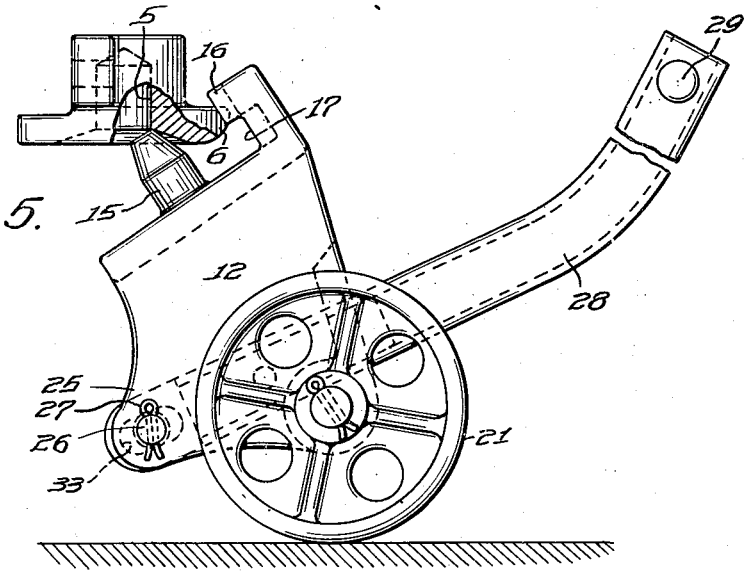
Fig. 5 is a side elevation generally corresponding to Fig. 3 but showing the jack in a different position.

In accordance with the invention a coupling 1, forming one of the two component elements of the jack as a whole, is permanently positioned on the truck, preferably at the center of its front end, and rigidly secured to a convenient part, such as its transverse end wall W, by screws or bolts 2 extending through holes 3 in ears 4 on the coupling, cleat C across the front of the truck being suitably recessed to receive it if necessary although if desired the coupling may be attached directly to the cleat. The coupling has a downwardly opening, substantially cylindrical socket 5 at its center, and its under face is slightly hollowed out around the mouth of this socket for a purpose which will hereafter appear; at its lower edge, moreover, it has an integral forwardly projecting substantially semi-circular lip 6 rounded on its under side as best shown in Figs. 3 and 5. It is preferably made in one piece, as by forging or casting, and is provided on the opposite side of the socket from the lip with plane faces 7, 8, normal to each other forming surfaces for engagement with the part of the truck to which the coupling is to be attached, and when so attached it thus becomes in effect a part of the truck adapted for connection to and disconnection from the other component of the jack, now to be more fully described. In Figs. 2-5 inclusive in which the coupling is shown apart from the truck, holes 3 are unoccupied by bolts or screws 2 but it will be understood the latter are normally present when the coupling is mounted on the truck.

More specifically this element which I call the jack proper by which general term I designate the entire mechanism movable relatively to the coupling, comprises a generally inverted U-shaped body 10 having a central portion or bridge 11 connecting laterally spaced parallel depending arms 12 and 13 preferably integral therewith. The upper surface of the bridge is plane and from it rises a cylindrical pintle 15 desirably somewhat tapered at its end to facilitate its insertion into the coupling socket 5, said plane surface forming a platform upon which the coupling rests when the pintle is seated in the socket. Extending upwardly from the front edge of the bridge 11 is an overhanging, generally segmental lip 16 which cooperates with the bridge to form a groove or track 17 for lip 6 on the coupling whereby when pintle 15 is in socket 5 it is prevented from accidental dislodgement by axial movement but left free for pivotal movement about its axis, the surface of the bridge engaging the lower face of the coupling to afford support to it and hence to the front end of the truck.

Inwardly directed bosses 18, 19 are formed at the extremities of depending arms 12, 13 and bored to receive a transverse axle 20 on the ends of which the wheels 21 of the jack are rotatably mounted and maintained in place by cotter pins 22 and washers 23 or in any other convenient way. Axle 20 is secured in the arms by a set screw 24 which normally prevents it from rotating or sliding axially.

Arms 12, 13 are formed with rearwardly extending projections 25 bored to receive a pivot pin 26 parallel to axle 20 and held in the arms by cotter pins 27, and a guiding tongue 28 is attached to the jack by means of this pin 26. The tongue is desirably tubular, of rectangular cross-section, and curved downwardly and rearwardly from its upper forward end, provided with a transverse handle 29, to its rear lower end which extends between arms 12, 13 of the jack body and receives the square shank 30 of a head 31 secured in the tongue by a pin 32. Pin 26 passes through a hole 33 in head 31 which hole is substantially circular midway its ends and thus loosely fits the pin at this point but flares laterally outwardly therefrom in opposite directions, as best indicated in Fig. 2, so as to permit limited oscillatory movement of the head, and hence of the tongue, in a plane of the pin axis, as well as pivotal movement about said axis.

Adjacent their front edges arms 12, 13 are provided with inwardly projecting abutments 35 which are spaced apart sufficiently to provide a slot 36 through which the tongue can move vertically about pin 26 as a pivot whereby the height of handle 29 above the floor can be adjusted as desired by the operator to enable him conveniently to move as well as to guide the truck, the tongue engaging the walls of slot 36 when the jack is to be turned about pintle 15 while permitting the truck to be pulled or pushed through its connection with pin 26. The upper edges 35a of abutments are beveled rearwardly and form with the adjacent under side of bridge 11 of the jack body rectangular notches 38, 39 into which the tongue may be selectively entered by swinging it to the right or left when it is aligned with them.

It will be readily understood that in operating the jack the tongue can either be brought into one of the notches 38 or 39 or retained in slot 36 due to the capacity for free movement both laterally and vertically provided by pin 26 and flared hole 33 in the tongue head. Consequently when the jack is to be connected with the coupling to raise the truck end from the floor preparatory to moving the truck, the jack, preferably with the tongue in engagement with axle 20 as indicated in Fig. 5, is moved toward the coupling so as to bring the tapered end of pintle 15 into the hollowed out lower face of the coupling and then into socket 5 in the latter, lip 6 on the coupling entering groove 17 formed by lip 16 on the jack bridge during this movement; downward and rearward pressure on the tongue in engagement with the axle then slides the bridge of the jack under lip 6 on the coupling and around the rounded-off lower face of the latter to lift the truck end and finally bring the cooperative plane faces of the bridge and coupling together as the pintle slides into coupling socket 5, where it serves as a king bolt or pivot on which the jack can now turn for steering the truck. The jack is preferably so constructed that when the operation just described is completed, axle 20 is just "over center" with respect to the axis of pintle 15 so there is little or no tendency for the jack to tip over, either forward or backward, after it has been positioned as indicated in Fig. 3. The tongue can therefore be raised from engagement with the axle as soon as the jack is in place and held at any height convenient to the operator for moving the truck, or steering it by turning the jack about the axis of pintle 15.

To remove the jack after the truck has been placed in the desired position, the tongue is raised to engage the front corner of the bridge as indicated in Fig. 3 and is preferably swung sideways into one of the notches 38, 39, thus temporarily interlocking it with the jack body to prevent relative pivotal movement between it and pin 26; the tongue is then raised slightly still further, causing the jack body to swing outwardly relatively to the coupling and reversing the operation of lifting the truck which has just been described. After axle 20 passes the plane of the axis of the pintle the weight of the truck tends to cause it to drop quickly and slide the jack from under it and this tendency, if not controlled, might unduly jar the truck or its contents upon contact of feet F with the floor. Engagement of the tongue in one of the notches 38, 39, however, which, as noted, substantially interlocks the tongue with the jack body, affords control of the latter which enables the operator to prevent it from sliding out from under the truck too rapidly, and by allowing the tongue to rise but slowly after the axle has passed center the operator can therefore gently lower the truck until feet F engage the floor and can then withdraw the jack entirely from the coupling without causing any undue jar or shock to the truck or its burden.

As the guiding tongue with its attached head pivoted to the jack body constitutes the sole moving part of the jack proper, excepting of course the supporting wheels, it will be apparent the jack may be made of strong and durable parts which are not likely to get out of order and will therefore remain serviceable over a long period of useful life while the convenience with which it may be operated, and the simplicity of control of the several movements afforded by the novel construction I have devised render it eminently suitable for use in connection with a wide variety of trucks for many different purposes. Thus the capacity of my jack for raising and lowering the truck very gently, and under full control of the operator, permits it to be used in association with trucks carrying fragile articles which might be broken or damaged by operation of jacks heretofore known which subject the truck to a more or less severe jar or shock either in raising or lowering it. Moreover the capacity of the jack handle for vertical adjustment to suit the height of the operator renders the jack more convenient to use than those in which the handle must be carried at a fixed height from the floor.

Additionally, as the guiding tongue is connected with the jack body at a point in rear of a line drawn from the center of pintle 15 to the center of axle 20 and above the horizontal plane of the latter when the jack is in use, the draw of the tongue, which is usually slightly upward as well as forward, exerts its principal thrust against the coupling to move the truck without materially tending to dislodge the jack from its connection with the coupling. The overhanging lip 16 adjacent coupling lip 6 is also instrumental in preventing accidental dislodgement of the jack from the coupling, as when the truck is being reversed or if the wheels of the jack encounter an obstruction, as engagement of these lips prevents the jack from swinging rearwardly under the truck.

As the jack proper is entirely removable from the coupling which remains to all intents and purposes an integral part of the truck after it has been once secured thereto, it will be apparent that but one jack may be interchangeably employed to service a plurality of trucks suitably equipped with the relatively inexpensive couplings.

While I have herein illustrated and described one embodiment of the invention with considerable particularity, it will be understood I do not desire or intend to limit or confine myself thereto in any way as changes and modifications in the form, construction and arrangement of the several parts, in their relationship to each other and/or to the trucks or the like with which they are to be associated will readily occur to those skilled in the art and may be made if desired without departing from the spirit and scope of the invention as defined in the appended claims.

Having thus described my invention, I claim and desire to protect by Letters Patent of the United States:

1. In combination with a truck of the character described, a coupling secured to the truck having a pintle-receiving socket, and a jack comprising a body having a pintle adapted to enter said socket, an axle extending transversely of the body, wheels journaled on the axle, a pivot pin carried by the body substantially parallel with the axle, a tongue having a universal connection with the pin for selective oscillatory movement relatively to the body in a plane parallel to the axle and also in a plane normal thereto, and abutments carried by the body presenting surfaces paralleling each of said planes and selectively adapted for engagement by the tongue to move the body in response to movement of the tongue.

2. In combination with a truck of the character described, a coupling secured to the truck having a pintle-receiving socket, and a jack comprising a body having a pintle adapted to enter said socket, an axle extending transversely of the body, wheels journaled on the axle, a pivot pin carried by the body substantially parallel with the axle and a tongue connected with the pin for selective oscillatory movement transversely of the body in a plane parallel to the axle and also for movement in a plane normal thereto, the body having formed thereon abutments defining a slot for guiding the tongue during its last mentioned movement and notches adjacent an extremity of said slot respectively adapted to receive the tongue at the limits of its first mentioned movement.

3. In combination with a truck of the character described, a coupling carried by the truck having a socket and a segmental lip coaxial therewith and a jack cooperative with the coupling comprising a body, supporting wheels, a pintle projecting from the body and entering the coupling socket, an overhanging lip carried by the body and defining with a surface thereof an arcuate groove receiving the lip of the coupling, a tongue having a substantially universal connection with the body to enable selective oscillatory movement of the tongue relatively to the body in planes normal to each other, and abutments projecting from the body presenting surfaces normal to the paths of said movements selectively engageable by the tongue to move the body about the wheel axis or about the pintle axis.

4. In a truck jack of the character described, a jack body, an axle extending transversely thereof, means on the body defining a slot normal to the axle terminating in laterally spaced notches, a tongue pivotally secured to the body and adapted for reception in either notch and for movement relatively to the body either in said slot in a plane normal to the axle or alternately from one notch to the other in a plane parallel to the axle.

5. In a truck jack of the character described, a body comprising a pair of depending spaced parallel arms, an axle carried thereby, wheels on the axle, a pivot pin extending between the arms parallel to the axle, abutments carried by the arms on the opposite side of the axle from the pivot pin and a tongue connected with the pin adapted for selective engagement with said abutments to control the jack.

6. In a truck jack of the character described, a body comprising a pair of depending spaced parallel arms, an axle carried thereby, wheels on the axle, a pivot pin extending between the arms parallel to the axle, abutments carried by the arms on the opposite side of the axle from the pivot pin and a tongue connected with the pin adapted for selective engagement with said abutments to control the jack, said tongue being movable both about and parallel to the pin and said arms defining the limits of said last mentioned movement.

7. In a truck jack of the character described, a body comprising a bridge and spaced parallel arms depending therefrom, an axle carried by the arms, wheels on the axle, a pivot pin extending between the arms parallel to the axle, abutments carried by the arms on the opposite side of the axle from the pivot pin, and a tongue connected with the pin adapted for selective engagement with said abutments to control the jack, said tongue being movable about and parallel to the pin within limits respectively defined by the axle and bridge in the case of the first mentioned movement and by the arms in the case of the second mentioned movement.

8. A truck jack of the character described, comprising a body having laterally spaced depending arms, an axle mounted therein, wheels on the extremities of the axle, a pivot pin extending between the arms on one side of the axle, a tongue carried by the pin and selectively movable in planes parallel and normal to the axle, said tongue being engageable with points on the body on the opposite side of the axle from the pivot pin to enable the body to be rotated about the axle, and a pintle extending upwardly from the body between the pivot pin and said points adapted to enter a socket upon a truck.

9. A truck jack of the character described, comprising a generally inverted U-shaped body having a central bridge and laterally spaced arms depending therefrom, an axle carried by the arms, wheels mounted on the extremities of the axle, a pivot pin also carried by the arms on one side of the axle and extending parallel thereto, abutments projecting inwardly from the arms and defining a slot, a tongue supported on the pivot pin for vertical movement in said slot and for horizontal movement in the space between the upper ends of the abutments and said bridge whereby said tongue may be rested on the axle in alignment with the slot or upon either of said abutments, and a pintle rising from said bridge between the abutments and the pivot pin.

10. A truck jack of the character described, comprising a generally inverted U-shaped body having a central bridge and laterally spaced arms depending therefrom, an axle carried by the arms, wheels mounted on the extremities of the axle, a pivot pin also carried by the arms on one side of the axle and extending parallel thereto, abutments projecting inwardly from the arms and defining a slot, a tongue supported on the pivot pin for vertical movement in said slot and for horizontal movement in the space between the upper ends of the abutments and said bridge whereby said tongue may be rested on the axle in alignment with the slot or upon either of said abutments, and a pintle rising from said bridge between the abutments and the pivot pin, said bridge carrying an upwardly directed overhanging segmental lip on the side of the pintle adjacent the abutments adapted to receive a portion of a coupling between it and the upper surface of the bridge.

11. In a truck jack of the character described, a body comprising a pair of spaced depending arms, coaxial supporting wheels connected therewith, means carried by the body for pivotally attaching it to a truck, a tongue pivoted to the body for movement in a plane normal to the wheel axis and oppositely inwardly projecting abutments carried by the arms adapted for selective engagement by the tongue for turning the body about the axis of said attaching means.

GEORGE C. NOROS.